United States Patent
Janakiraman et al.

(10) Patent No.: US 9,369,473 B2
(45) Date of Patent: Jun. 14, 2016

(54) METHOD AND SYSTEM FOR EXTENDING NETWORK RESOURCES CAMPUS-WIDE BASED ON USER ROLE AND LOCATION

(71) Applicant: Cisco Technology, Inc., San Jose, CA (US)

(72) Inventors: Rajagopalan Janakiraman, Cupertino, CA (US); Sridhar Subramanian, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 335 days.

(21) Appl. No.: 14/019,634

(22) Filed: Sep. 6, 2013

(65) Prior Publication Data
US 2015/0074741 A1    Mar. 12, 2015

(51) Int. Cl.
H04L 29/06    (2006.01)
H04L 29/08    (2006.01)
H04L 29/12    (2006.01)
H04L 12/753   (2013.01)
H04L 12/707   (2013.01)

(52) U.S. Cl.
CPC ............ *H04L 63/107* (2013.01); *H04L 61/103* (2013.01); *H04L 61/2084* (2013.01); *H04L 63/0209* (2013.01); *H04L 63/08* (2013.01); *H04L 63/101* (2013.01); *H04L 67/32* (2013.01); *H04L 45/24* (2013.01); *H04L 45/48* (2013.01)

(58) Field of Classification Search
CPC . H04L 63/0209; H04L 63/08; H04L 63/0815; H04L 63/0876; H04L 63/0884; H04L 63/0892
See application file for complete search history.

(56) References Cited

U.S. PATENT DOCUMENTS

| | | | |
|---|---|---|---|
| 2011/0122889 A1* | 5/2011 | Pacella | H04L 45/742 370/428 |
| 2012/0144031 A1* | 6/2012 | Hu | H04L 45/04 709/224 |
| 2013/0103819 A1* | 4/2013 | Meyer | H04L 61/2007 709/223 |

* cited by examiner

*Primary Examiner* — Edward Zee
(74) *Attorney, Agent, or Firm* — Meunier Carlin & Curfman LLC (57) ABSTRACT

A method, system, and computer readable medium is disclosed which utilizes the LISP control plane to increase communications and access to enterprise resources in a network with multiple subnetworks, such as a university setting. As a result, the various embodiments of the present invention provide a routing and services dimension to enterprise discovery protocol traffic, such as Apple Bonjour traffic. A LISP instance ID, which is carried in the LISP header, is used to associate one or more end user devices with specific enterprise resources in a particular subnetwork or a service domain, wherein these resources may be accessed by the end user device even if the end user device migrates to another subnetwork. Another embodiment of the invention limits routing services advertisements from enterprise services to a subset of end user devices associated with particular user EIDs by using L2-LISP multicast techniques.

18 Claims, 9 Drawing Sheets

METHOD AND SYSTEM FOR EXTENDING NETWORK RESOURCES CAMPUS-WIDE BASED ON USER ROLE AND LOCATION

BACKGROUND

For years, computer networks in workplaces and universities have comprised relatively static client/server systems. A typical university computing arrangement would include a computer laboratory with associated printers and other resources that the student user, after leaving the laboratory, would not expect to be able to access. While these computer networks offer predictable and relatively secure means of providing access to computing resources, these rely on one fundamental assumption-host immobility. IP addresses are statically assigned to devices, access points, or services, and therefore, movement between networks means device, service, or network elements are always lost.

Today's hosts tend to be the exact opposite of immobile, and therefore, applications have been developed to work from anyplace, anywhere, at anytime, and from any device. To answer this growing need for mobility, we have also seen the emergence of the mobile/cloud computer network model which allows users to store their information "in the cloud", and later access this information from any computer connected to the internet. Furthermore, with the increased use of BYOD ("Bring Your Own Device") networks in such environments as college campuses and workplaces, the ability to provide resources to hosts as they migrate across subnets in a network is imperative as users are taking their personal devices to school or work, then returning home with their personal devices.

However, while the mobile/cloud model lends increased support to end user mobility, consumer discovery protocol traffic, including without limitation Apple Bonjour traffic, is still subject to the same geographic limitations as predecessor networks. A mobile/cloud network may include one or more subnetworks, and each subnetwork may in turn include consumer discovery protocol traffic. Since most consumer discovery protocols, herein referred to as enterprise or BYOD services, maintain the notion of a local area network (LAN) and are not routable, these BYOD services cannot be made available to end users as they migrate to other subnetworks across a LAN network. These BYOD services may include, without limitation, such devices as smart phones, projectors, scanners, and printers.

Thus, it is easy to imagine various situations wherein a student end user in a university environment or corporate executive in a large enterprise may desire to access these types of BYOD services across various subnetworks. However, routing the enterprise service traffic throughout the network would make the BYOD services available to all of the users of the routed network rather than a subset of privileged end users. Therefore, there is a need in the art for a method, system, and computer readable medium for providing users with privileged and secure access to BYOD services as they travel in a mobile/cloud-based network environment without making those BYOD services available to all end users.

SUMMARY

Broadly described, methods, systems, and computer readable mediums are provided for managing BYOD services and communications in a campus-wide network. The term "campus" is used throughout this application to not only refer to a university setting, but any network which includes multiple users and subnetworks. In a first embodiment, a method of extending BYOD services across subnetworks is provided by utilizing the LISP control plane. In a second embodiment, a method is provided for managing enterprise service advertisements to end user devices in a network. In an alternate embodiment, a verification process determines if an end user device may access an enterprise service or receive a service advertisement, respectively. In yet another embodiment, a computer readable medium is provided which includes instructions for extending enterprise services and managing enterprise service advertisements in a network.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF DRAWINGS

Like reference numbers and designations in the various drawings indicate like elements.

DETAILED DESCRIPTION

Figure 1:
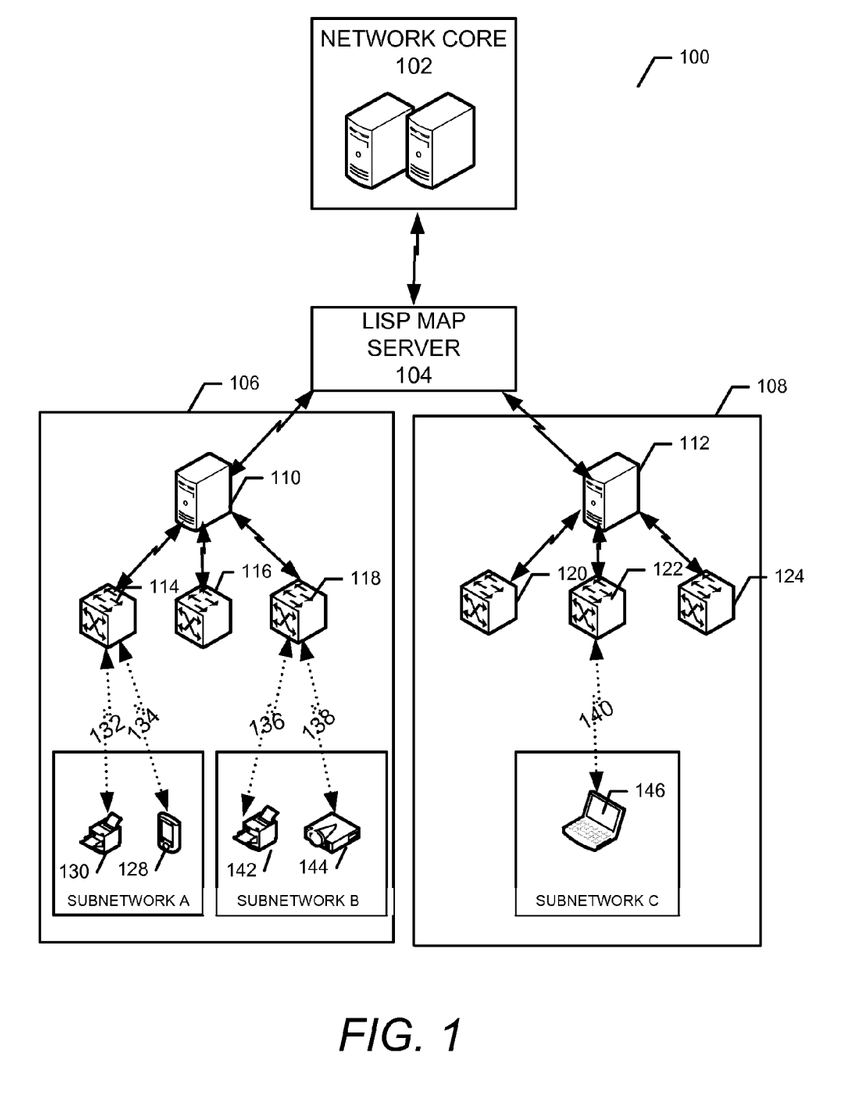
FIGS. 1 and 2 are block diagrams of an example environment for providing enterprise resources across multiple subnetworks.

FIG. 1 is a block diagram of a network incorporating an embodiment of the invention. Network 100 is a L3 network which comprises a network core 102, which may include one or more servers serving as the backbone of network 100. Network core 102 comprises equipment to provide paths for the exchange of information between a plurality of L2 distributed networks (106 and 108). Those skilled in the art will appreciate that various types of equipment and structure may be included in the network core within the spirit and scope of this invention. Each distributed network includes a distributed network server (110 and 112, respectively), which is coupled to one or more routers (114-124). As described further in FIG. 9, each of these routers 114-124 include a processor and memory for creating, maintaining, and storing the multicast tree described in FIGS. 3-8.

To enable communication between distributed networks 106 and 108 regarding end user devices as these end user devices travel throughout the network 100, network core 102 provides locator/identifier separation protocol (LISP) map server 104 which may (but is not required to) be located within the network core 102. LISP is an addressing architecture which represents each end user device with an endpoint identifier ("user end point ID" or "user EID") and a routing locator (RLOC), along with a 24 bit identifier in the header portion, which identifies the forwarding instance for the user EID. The user EID identifies specifically "who" the user is of the device or the specific access point. For example, the user EID may comprise a student laptop in the case of a student user in a university campus network. A user EID may also identify a specific access point, such as a WIFI hotspot in a campus coffee shop. Each end user device is, thus, associated with a user EID.

On the other hand, the RLOC identifies the physical location where the end user device is connected to the network, wherein various physical locations in the network will have specific static associated RLOCs. Thus, LISP separates the identity of the device or access point from the identification of where the end user device is physically located, which enables internet services to remain continually connected when users move around or change end user devices by communicating information to the LISP map server 104 which is then accessed by routers 114-124.

In a first embodiment of the invention, the LISP header comprises a LISP instance ID. This LISP instance ID is a 24 bit entity in the LISP header which associates an end user device with specific enterprise services. For example and not limitation, as shown in FIG. 1, end user device 128 is located in subnetwork A, along with a printer 130. Those skilled in the art will appreciate that any number of devices may comprise an "end user device", including without limitation a smartphone, laptop, or tablet. Printer 130, along with printer 142, projector 144, and laptop computer 146 comprise enterprise services available for users in network 100 although these enterprise services reside in different subnetworks. In a network that does not incorporate this invention, enterprise services across subnetworks A-C cannot be discovered automatically and may not be available for use by an end user device unless the end user device was in the same subnetwork as the particular enterprise service. These specific enterprise services in subnetworks A-C are shown merely for example, and not limitation. Those skilled in the art will appreciate that any number of different configurations and device types may comprise enterprise services within the spirit and scope of the present invention, and any number of subnetworks may be included in network 100.

Enterprise services are communicatively coupled to a router 114-124 (depending on the router servicing the subnetwork wherein the enterprise service is located) via an enterprise discovery protocol connection, which may comprise (without limitation) Apple Bonjour. This connection, referred to herein as an "enterprise connection", is shown as 132-140 in FIG. 1. End user devices may query network 100 via the service discovery protocol to present available enterprise services, at which time the available enterprise services are added to a service catalog of enterprise services stored in the appropriate router 114-124 depending on the location of the specific enterprise service. In the case of printer 130 subnetwork A, printer 130 would appear in a service catalog stored in router 114. The service catalog may then be registered at the LISP map server 104 by abstracting the information from the LISP instance ID. The service attributes for a link local multicast service may then be derived by application proxy techniques in the distribution router.

Figure 2:
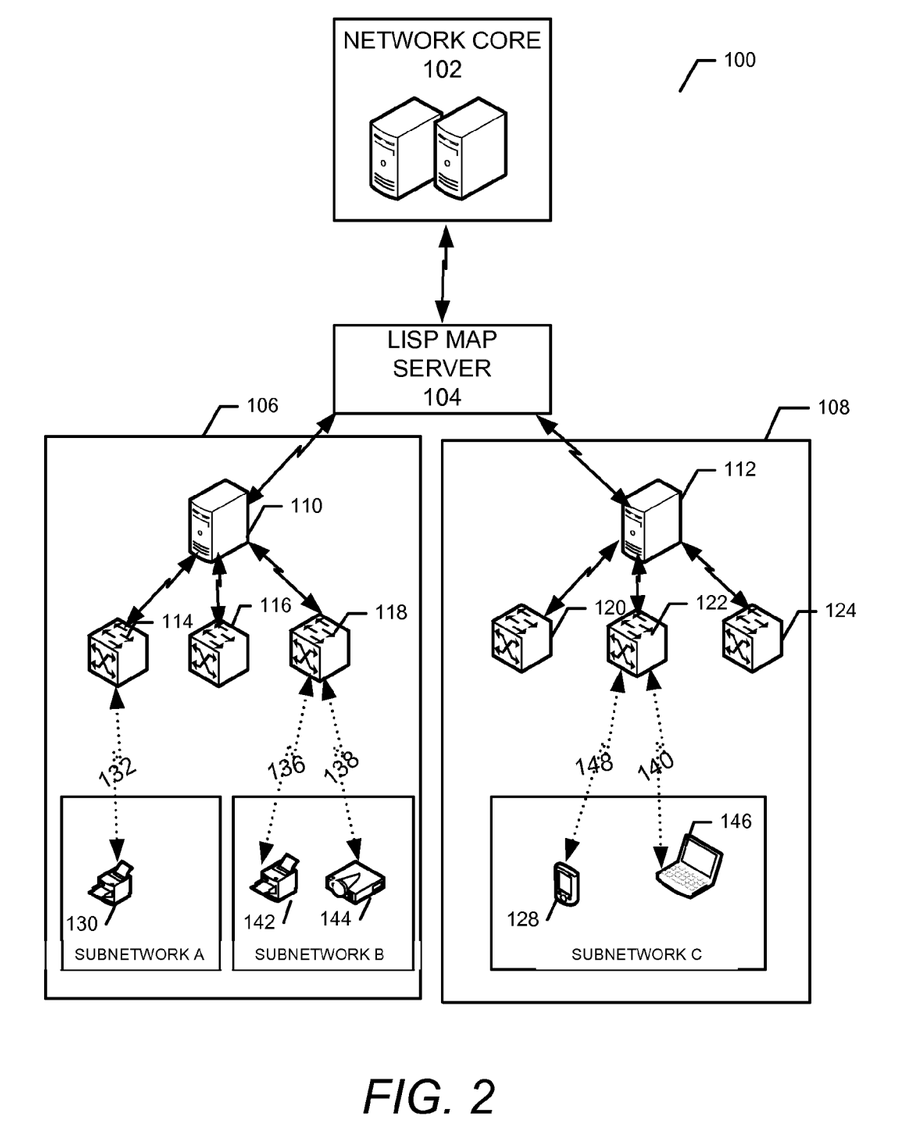

Once the service catalog is built, network 100 uses the LISP map server 104 in combination with the L2 distributed networks (L2-LISP) to allow end user devices to access an enterprise service in the L2 distributed network irrespective of where end user device is located and if the end user device is granted access to the particular enterprise service (i.e., if the end user device is authorized to access the particular enterprise service). For example, as shown in FIG. 2, once end user device 128 migrates to subnetwork C, the various embodiments of the invention would allow end user device 128 to still access printer 130, even though end user device 128 is in a different subnetwork (which, in FIG. 2, is shown for exemplary purposes as subnetwork C). Therefore, by using L2-LISP, the various embodiments of the present invention provide available enterprise services to end user devices as they migrate through various subnetworks in a network 100 without the need to advertise the service catalog (wherein the service catalog comprises all available enterprise services) to all end user devices in the network 100.

Figure 3:
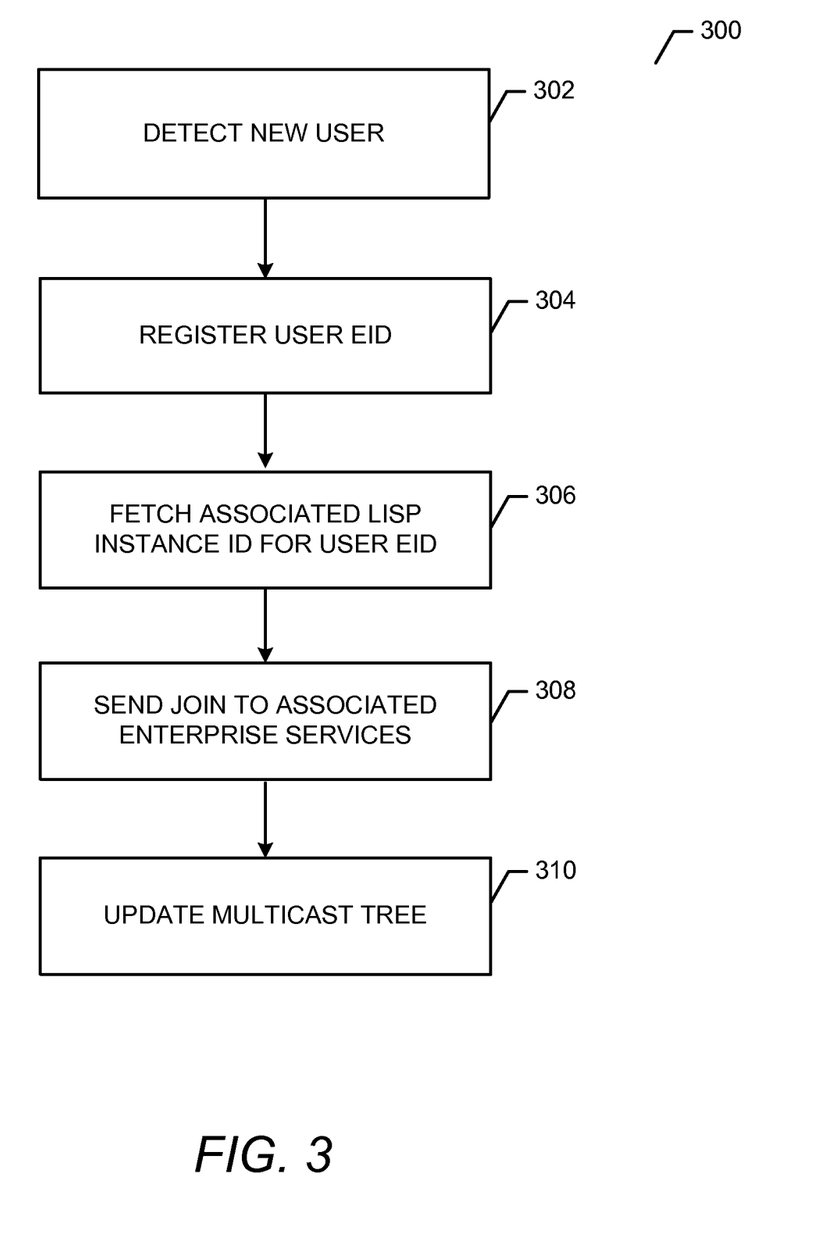
FIG. 3 illustrates an example flow diagram of an end user device registration process.

FIG. 3 illustrates an example flow diagram of an end user device registration process in accordance with the various embodiments of the invention. It should be noted that FIG. 3 illustrates process 300 from perspective of a router in a distributed network, such as any of routers 114-124 in FIGS. 1-2. For exemplary purposes only, the router associated with end user device 128, which would be router 114, will be referenced (along with end user device 128) in the description of this figure for exemplary purposes only and not for limitation.

Once end user device 128 joins network 100, router 114 will detect the new end user device 128 through data packets received from the end user device 128 or through other signaling means (such as a mobility trigger) at step 302. The router 114 then registers the user EID associated with the end user device via a dynamic LISP EID registration process ("registration process") at step 304.

The user EID (or the end point identifier) denotes the end user device's MAC and IP address. During the registration process, the router 114 sends the binding of the end user device MAC address, the end user device IP address, or the RLOC of router 114 (hereinafter referred to as "registration data") to the LISP map server. The RLOC of router 114 is the IP address of router 114 which may be accessed by the other routers 116-124 via regular routing. The LISP map server maintains the registration data in the database, and replies to queries from other RLOC routers pertaining to this user's location.

In this embodiment, during the registration process, the router 114 proceeds to step 306 and also performs a fetch operation from the LISP map server 104 to determine the LISP instance IDs which are associated with this user EID. The LISP instance ID will represent which enterprise services this particular user EID is authorized to access or needs to access. All of the announcements, requests and acknowledgements related to a service are forwarded in a L2-LISP multicast tree which is identified by a particular LISP instance ID, and comprises other enterprise services and user EIDs that have already joined the particular LISP instance ID. This multicast tree is an instance specific tree which can be envisioned as a broadcast domain, wherein the communicating nodes are interested in the messages specific to the service. A router (114-124) joins, and is added to, this multicast tree if the router has either: i) an enterprise service or ii) a user (using an end user device) which interested in an enterprise service located behind the router (such as 130 in FIG. 1) and represented as a LISP EID. A router which does not have a user or a service identified by the instance will not join the multicast tree and so will not receive the service messages related to the instance.

Once router 114 determines which enterprise services are needed by this user EID, the router 114 sends a L2 LISP join request to each of the instances representing the enterprise services at step 308. If the router has already joined this instance on behalf of another interested user or service, it does not re-join the tree. In one of the embodiments, the multicast tree is represented by a IP multicast tree, with L2 LISP joins achieved by IP multicast joins through the Protocol Independent Multicast protocol. In another embodiment, the multicast tree is achieved by building the replication set in each of the participating routers with each replication set identifying a unicast destination representing one the L2 LISP receivers/routers interested in the instance. This method is noted as "head-end" replication. While the method of using IP multicast is efficient in the network bandwidth usage, the head-end replication is simpler to implement and does not require IP multicast protocols running in the network. For the purposes of simplicity, we describe the multicast tree in the rest of the document using the head end replication method.

Once the join requests are accepted by a router which has the enterprise service registered as one of its local EIDs, the router responds with an acknowledgement. At step 310, the router 114 updates the multicast tree with the information from this acknowledgement to populate the multicast tree for the particular LISP instance ID with this additional enterprise service. For each instance specific multicast tree, the router maintains a list of routers which have the service or interested receivers as well as the local receivers or service, which represented as EIDs. This enables end to end communication between the services and hosts.

Figure 4:
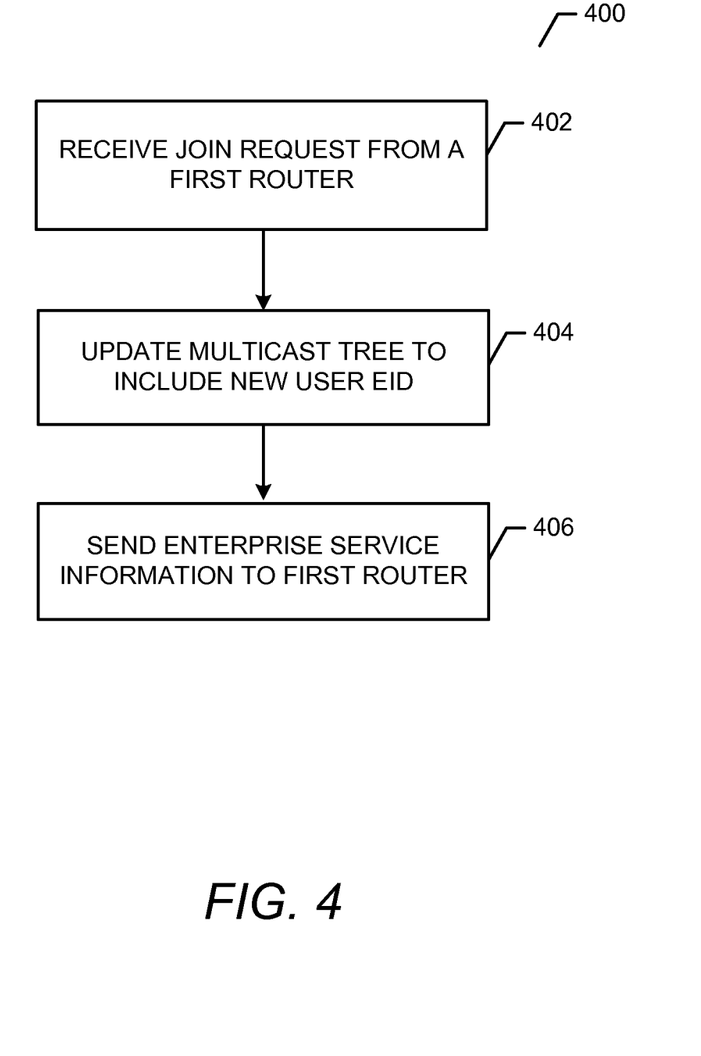
FIG. 4 illustrates an example flow diagram of the processes performed to update a multicast tree.

FIG. 4 illustrates an example flow diagram of the processes performed to update a multicast tree. At step 402, a second router in network 100 receives a join request from a first router servicing a subnetwork with a new end user device associated with a user EID. This first and second router may comprise any router in network 100. For purposes of illustration, the second router includes enterprise services that are associated with the same LISP instance ID as the new user EID. Thus, while the first router executes method 300 to register a new user on network 100, other routers in network 100 also update their multicast trees to include the new user EID associated with the new end user device at step 404. Once the multicast tree has been updated to include the new user EID associated with the new end user device, the second router sends enterprise service information to the first router to indicate which specific enterprise services are connected to the second router that are also associated with the same LISP instance ID.

Figure 5:
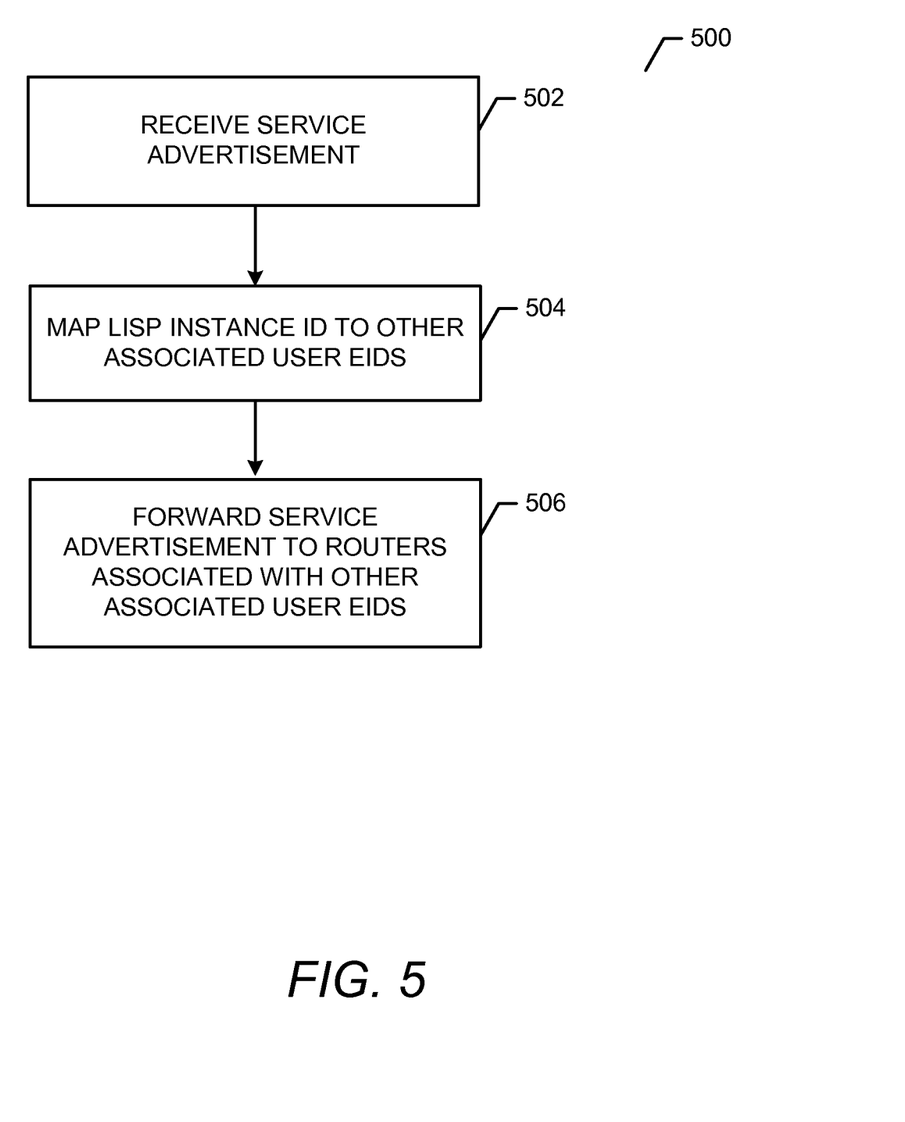
FIG. 5 illustrates an example flow diagram of the processes performed to route an enterprise services advertisement.

FIG. 5 illustrates an example flow diagram of the processes performed to route an enterprise services advertisement (also referred to herein as a "services advertisement") to a subset of user EIDs across subnetworks in network 100. Several situations exist wherein an enterprise service on network 100 would want to advertise the availability of that enterprise service to specific users on network 100 by routing a services advertisement in the form of a multicast packet. For exemplary purposes only and not limitation, in a university setting, students residing in a particular dormitory may receive specific messages regarding specific enterprise services in the dormitory premises, wherein the students may be located in various subnetworks across campus at the time the services advertisement is issued. In a second embodiment of the present invention, these services advertisements are forwarded only to specific end user devices associated with a particular LISP instance ID. Thus, these services advertisements for these enterprise services are not being pushed to all users in network 100, but rather, only being pushed to a subset of users with user EIDs which are associated with a particular LISP instance ID in the LISP map server 104. This subset of users may have one or more "associated" routers, wherein an associated router is the router servicing the subnetwork where the end user device associated with the user EID is located.

To effectuate a limited delivery of service advertisements via process 500, once a service advertisement is received at step 502 by a router 114 (for exemplary purposes only in this description and elsewhere in this application, referring to router 114 in the case of a service advertisement received from printer 130), router 114 will abstract the LISP instance ID by looking up the user EID associated with the service advertisement from the LISP map server 104. This process, referred to as a multicast mapping process, is performed at step 504. Once router 114 has obtained the LISP instance ID from the LISP map server 104 via the multicast mapping process at step 504, the router 114 will forward the service advertisement to other routers 116-124 in network 100 that are associated with the other user EIDS with the same LISP instance ID at step 506.

Figure 6:
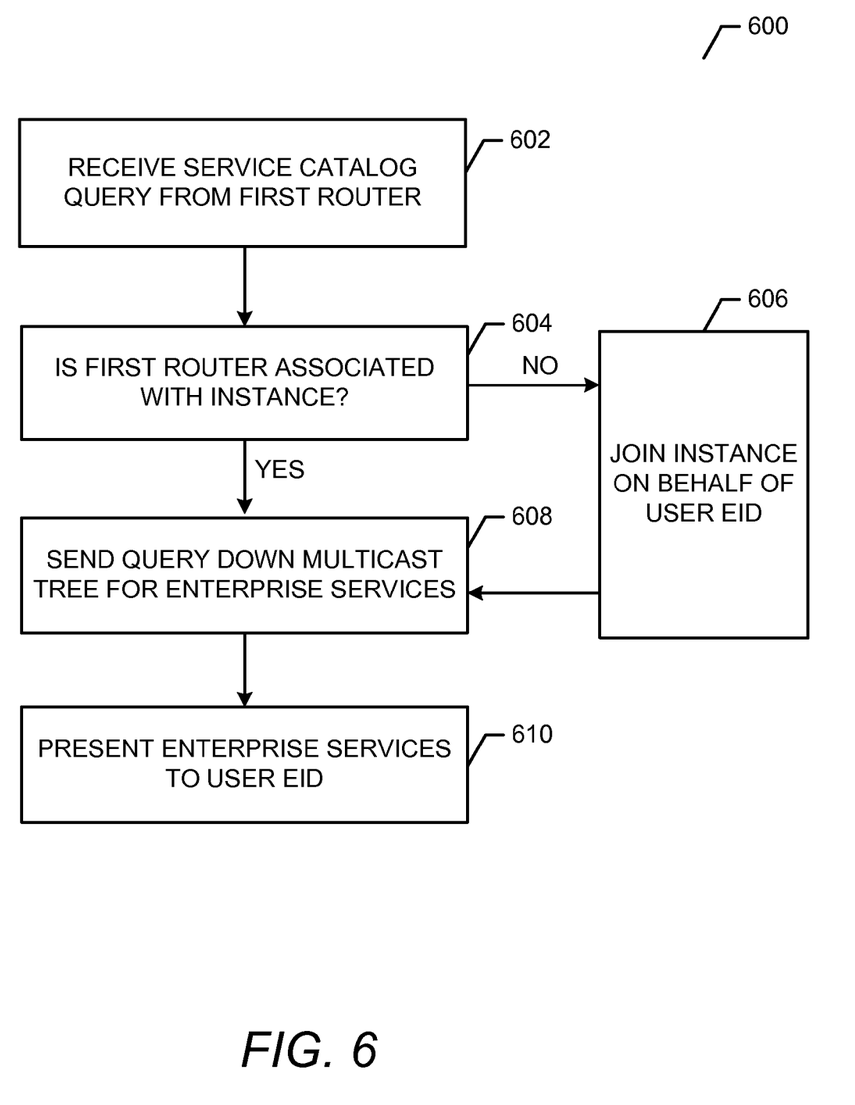
FIG. 6 illustrates an example flow diagram of the processes performed to attach a new end user device to the network.

FIG. 6 illustrates the processes performed to answer a user query for available enterprise services, also referred to as a "service catalog query". This process 600 may, but is not required, to occur as part of the new user registration process described in FIG. 4. When a router 114 receives a service catalog query from an end user device 128 at step 602, router 114 first queries the LISP map server 104 at step 604 to determine if the router 114 is associated with the LISP instance ID associated with the end user device which is sending the service catalog query. If the router 114 is not associated with the LISP instance ID, then the router 114 joins the LISP instance ID on behalf of the particular user EID which is sending the service catalog query at step 606.

Both paths converge at step 608, wherein the router 114 sends a query down the multicast tree stored in router 114 to determine available enterprise services for the particular LISP instance ID. The router 114 then presents the available enterprise services that responded to the query at step signals generated during the end user device registration process (as described in FIG. 3) at step 610, regardless of the locations of the enterprise services ("enterprise service locations").

In an alternate embodiment, process 600 may include security protocols such as security group tag (SGT) or a role-based access control policy (ACL) which are associated with one or more security policies. In this alternate embodiment, the enterprise services presented at step 610 may result from the application of one or more security protocols. These security protocols may consider user privilege, user current location and the privilege of the requested enterprise services, wherein requested enterprise services are enterprise services of interest to the user. These security protocols may be applied in the LISP map server 104 during the dynamic EID registration process (described in greater detail in FIG. 7) and based on the security policies, the services or the instance IDs that are allowed for the particular end user device are communicated back to the router which was registering the end user device. The security policies may be flexibly defined to utilize the information regarding both the user EID associated with the end user device and the current location, and accordingly, present enterprise services that can be availed by the user EID.

Figure 7:
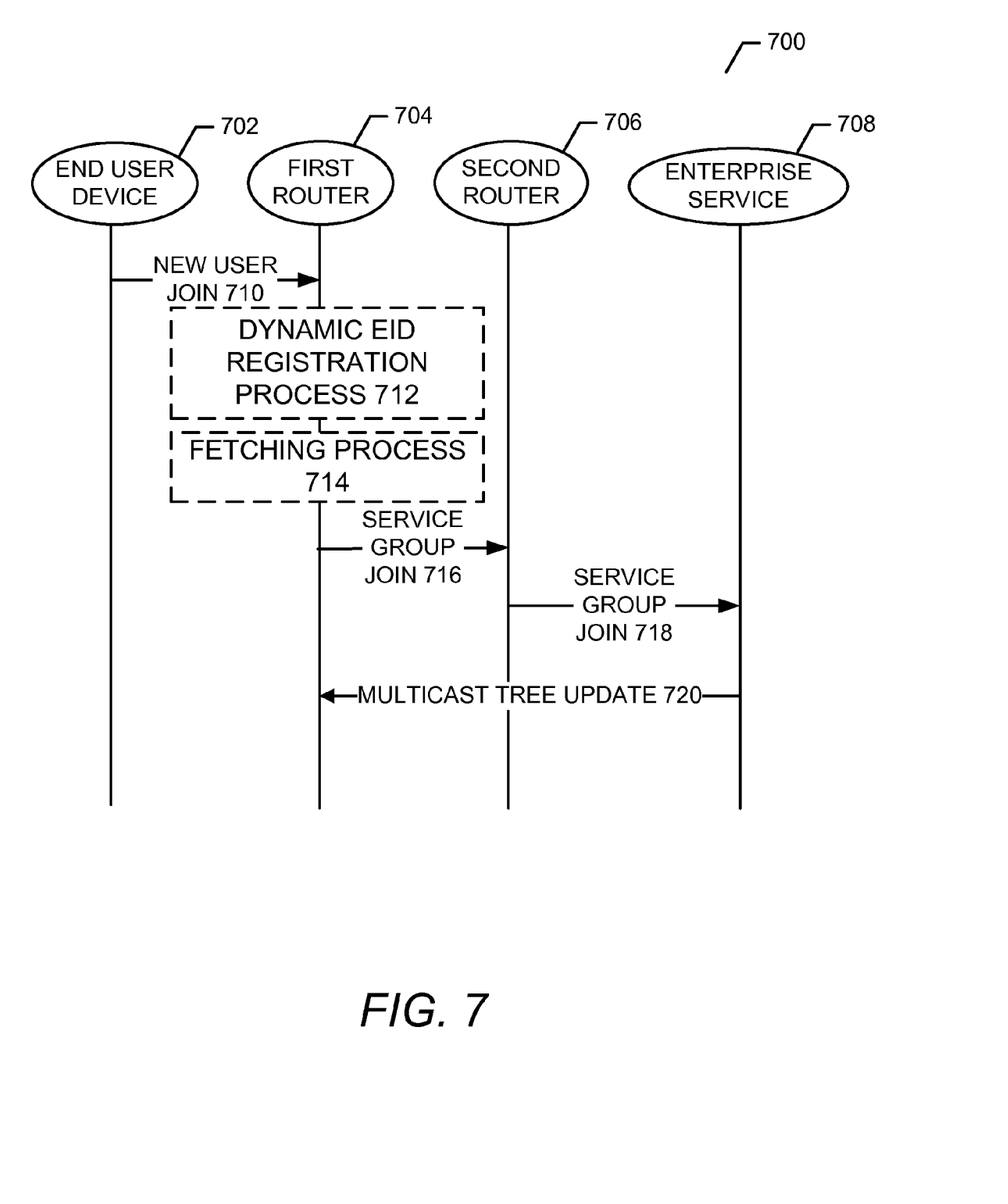
FIG. 7 is a signaling diagram illustrating the processes performed during the end user device registration process.

FIG. 7 is a signaling diagram illustrating the processes performed during the end user device registration process. Once end user device 702 joins network 100, first router 704 will receive a new user join request 710. To determine the user EID associated with this specific end user device, first router 704 then registers the user EID associated with the end user device 702 via a dynamic EID registration process 712 which includes dynamic LISP EID detection. Once the first router 704 has obtained the user EID for the end user device 702 from the dynamic EID registration process 712, the router 114 performs a fetching process 714. The fetching process 714 comprises the first router 704 querying the LISP map server 104 to determine the LISP instance ID which is associated with this user EID as well as identification information relating to enterprise services associated with the LISP instance ID.

Once router 114 determines which enterprise services are needed by end user device 702, the router 114 sends a service group join request 716 to the second router 706 associated with enterprise services 708. The second router 706 forwards a service group join request 718 to the enterprise service 708, and the enterprise service 708 responds to the first router 704 with information 720, in the form of a multicast tree update 720, to update the multicast tree at the first router to include enterprise services 708 as available to the user EID associated with end user device 702. In the alternate embodiment, an additional signaling exchange would occur to determine if the end user device 702 is authorized to access the enterprise services 708, which could occur by determining if the end user device 702 includes an appropriate security tag or any other appropriate security mechanism.

Figure 8:
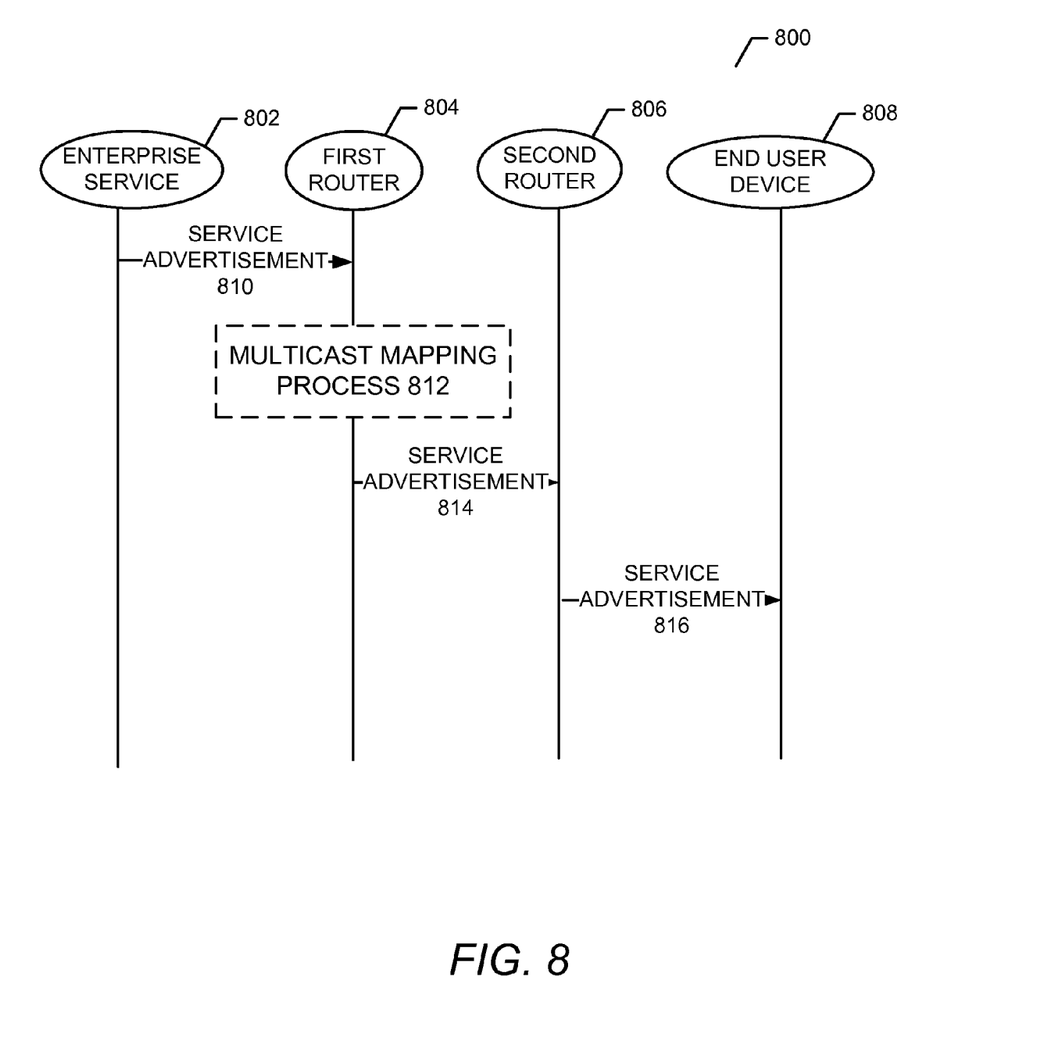
FIG. 8 is a signaling diagram illustrating the processes performed to route an enterprise services advertisement.

FIG. 8 is a signaling diagram illustrating the signals generated to route an enterprise services advertisement in accordance with process 500 associated with the second embodiment of the invention. To effectuate the limited delivery of service advertisements via process 500, once a service advertisement 810 is received from enterprise service 802 by first router 804, router 804 will perform a multicast mapping process 812, which comprises the first router 804 abstracting the LISP instance ID by looking up the user EID associated with the service advertisement from the LISP map server 104. Once the first router 804 has obtained the LISP instance ID from the LISP map server 104 via the multicast mapping process, the first router 804 will forward the service advertisement 814 to a second router 806. Second router 806 then forwards the service advertisement 816 to the end user device 808 associated with the LISP instance ID.

Figure 9:
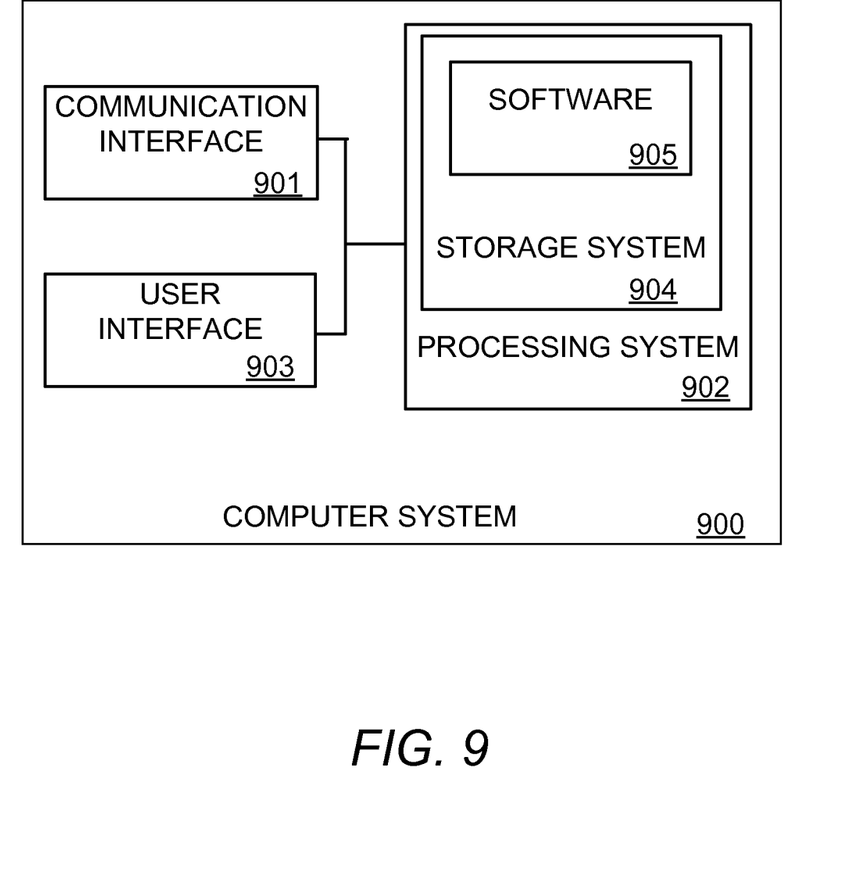
FIG. 9 is a block diagram illustrating a computer system configured to operate as described herein for managing enterprise resources.

FIG. 9 is a block diagram illustrating a computer system configured to operate as described herein for managing and accessing enterprise services. This computer system 900 may include, without limitation, any router 114-124 in FIGS. 1-2. Computer system 900 includes communication interface 901, processing system 902, and user interface 903. Processing system 902 includes storage system 904 which may include any type or quantity of memory. Storage system 904 stores software 905, and also may include without limitation, a multicast tree.

Processing system 902 is linked to communication interface 901 and user interface 903, and may be configured to execute the dynamic EID registration, fetching, and multicast mapping processes as described in FIGS. 7-8. In addition to a router 114-124, computer system 900 could include a programmed general-purpose computer, although those skilled in the art will appreciate that programmable or special purpose circuitry and equipment may be used. Computer system 900 may be distributed among multiple devices that together make up elements 901-905.

Communication interface 901 could include a network interface, modem, port, transceiver, or some other communication device. Communication interface 901 may be distributed among multiple communication devices. Processing system 902 could include a computer microprocessor, logic circuit, or some other processing device. Processing system 902 may be distributed among multiple processing devices. User interface 903 could include a keyboard, mouse, voice recognition interface, microphone and speakers, graphical display, touch screen, or some other type of user device. User interface 903 may be distributed among multiple user devices. Storage system 904 could include a disk, tape, integrated circuit, server, or some other memory device. Storage system 904 may be distributed among multiple memory devices.

Processing system 902 retrieves and executes software 905 from storage system 904. Software 905 may include an operating system, utilities, drivers, networking software, and other software typically loaded onto a computer system. Software 905 could include an application program, firmware, or some other form of machine-readable processing instructions. When executed by processing system 902, software 905 directs processing system 902 to operate as described herein to manage enterprise services in a network.

The various embodiments of the invention provide many benefits and advantages by providing a routing and services dimension to a consumer discovery protocol, such as Apple Bonjour, traffic. The various embodiments of the invention enable mobile and service reachability without any change in the underlying L2/L3 network infrastructure, and without requiring additional components to network architecture. Thus, the value of the network architecture is increased without any capital expenditure. Furthermore, the various embodiments of the present invention avoid user-wide service catalog advertisements using routing protocols, as the LISP map server 104 serves as a single contact for all enterprise services and user EIDs in the network 100. Also, the various embodiments of the invention allows flexible service to user mapping based on the user role and location, as the service instance to user control is entirely managed by the LISP map server 104, which also manages the end user device coordinates in the network 104. These benefits enable further refined techniques to manage the load on a given service and allow efficient load balancing of similar services.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be exercised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Particular implementations of the subject matter described in this specification have been described. Other implementations are within the scope of the following claims. For example, the actions recited in the claims may be performed in a different order and still achieve desirable results. As one example, the processes depicted in the accompanying figures do not necessarily require the particular order shown, or sequential order, to achieve desirable results. In certain implementations, multitasking and parallel processing may be advantageous. Further, any methods described in this application, including methods 300-600, may be implemented as computer software on a computer readable medium.

What is claimed is:

1. A method of providing an end user device associated with a user end point ID ("user EID") in a first subnetwork access to one or more enterprise services in a second subnetwork, the method comprising:
   - determining associated LISP (Locator/Identifier Separation Protocol) instance IDs for the user EID, wherein a LISP instance ID is associated with the one or more enterprise services;
   - fetching identification information for the one or more enterprise services from a LISP map server;
   - sending a service group join request on behalf of the user EID to the one or more enterprise services based on the identification information;
   - allowing the end user device in the first subnetwork to access an enterprise service regardless of the end host or enterprise service location; and,
   - updating a multicast tree, of a router, for a particular LISP instance ID to include the user EID joining the instance, wherein the multicast tree comprises other enterprise services and user EIDs that have already joined the particular LISP instance ID.

2. The method of claim 1, further comprising the steps of:
   - building a service catalog for the LISP instance ID, wherein the service catalog comprises one or more enterprise services associated with the LISP instance ID; and
   - registering the service catalog with a LISP map server.

3. The method of claim 2, wherein the service catalog is maintained at the router in the first subnetwork.

4. The method of claim 1, wherein the determining step further comprises registering the user EID by executing a dynamic EID registration process.

5. The method of claim 1, wherein the allowing step comprises verifying that the user EID is authorized to access the one or more enterprise services.

6. The method of claim 5, wherein the verifying step comprises confirming compliance with one or more security protocols.

7. The method of claim 6, wherein the confirming step comprises verifying compliance with Security Group Tag policies or ACL policies based on user privilege, user current location and the privilege of the one or more enterprise services.

8. The method of claim 1, wherein the one or more enterprise services comprise one or more printers, projectors, or file servers.

9. A method of distributing service advertisements to only a subset of end user devices, the method comprising the steps of:
   - receiving a service advertisement packet from an enterprise service in a first subnetwork with a first router;
   - determining the LISP instance ID associated with the enterprise service;
   - fetching the user EIDs associated with the LISP instance ID from a LISP map server;
   - mapping a second router associated with one of the user EIDs;
   - sending the service advertisement packet to the second router in a second subnetwork for delivery to one of the user EIDs; and,
   - sending the service advertisement packet in a multicast transmission to a multicast tree identified by a unique multicast group for identifying the users of the particular LISP instance.

10. The method of claim 9, wherein the fetching step further comprising verifying that the user EIDs are authorized to access the enterprise service.

11. The method of claim 9, wherein the sending step comprises sending the service advertisement packet in a unicast transmission to second router.

12. The method of claim 9, wherein the sending step comprises sending the service advertisement packet to the second router as part of a service catalog of enterprise services.

13. The method of claim 9, further comprising updating a service catalog for a particular LISP instance ID to include the enterprise service.

14. A non-transitory computer readable medium having instructions for providing an end user device associated with a user end point ID ("user EID") in a first subnetwork access to one or more enterprise services in a second subnetwork, the instructions, when executed by a computing device, causes the computing device to:
   - determine associated LISP instance IDs for the user EID, wherein a LISP instance ID is associated with the one or more enterprise services;
   - fetch identification information for the one or more enterprise services from a LISP map server;
   - send a service group join request on behalf of the user EID to the one or more enterprise services based on the identification information;
   - allow the end user device in the first subnetwork to access an enterprise service regardless of the end host or enterprise service location; and,
   - update a multicast tree, of a router, for a particular LISP instance ID to include the user EID joining the instance, wherein the multicast tree comprises other enterprise services and user EIDs that have already joined the particular LISP instance ID.

15. The non-transitory computer readable medium of claim 14, further comprising instructions, that when executed by the computing device, verify that the particular user EID is authorized to access the one or more enterprise services.

16. The non-transitory computer readable medium of claim 14, further comprising instructions that when executed by the computing device, receive a multicast tree update.

17. A non-transitory computer readable medium having instructions for distributing service advertisements to only a subset of end user devices, the instructions, when executed by a computing device, causes the computing device to:
   - receive a service advertisement packet from an enterprise service in a first subnetwork with a first router;
   - determine the LISP instance ID associated with the enterprise service;
   - fetch the user EIDs associated with the LISP instance ID from a LISP map server;
   - map a second router associated with one of the user EIDs;
   - send the service advertisement packet to the second router in a second subnetwork for delivery to one of the user EIDs; and,
   - send the service advertisement packet in a multicast transmission to a multicast tree identified by a unique multicast group for identifying the users of the particular LISP instance.

18. The non-transitory computer readable medium of claim 17, further comprising instructions, that when executed by the computing device, verify that the at least one user EID is authorized to access the enterprise service.

* * * * *